(12) United States Patent
Bergström et al.

(10) Patent No.: US 9,888,406 B2
(45) Date of Patent: Feb. 6, 2018

(54) REFERENCE SIGNAL DENSITY ADAPTATION

(71) Applicant: Telefonaktiebolaget L M Ericsson (publ), Stockholm (SE)

(72) Inventors: Per Bergström, Lulea (SE); Svante Bergman, Hagersten (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 374 days.

(21) Appl. No.: 14/494,314

(22) Filed: Sep. 23, 2014

(65) Prior Publication Data

US 2016/0088512 A1    Mar. 24, 2016

(51) Int. Cl.
| | |
|---|---|
| *H04L 27/26* | (2006.01) |
| *H04W 28/02* | (2009.01) |
| *H04B 7/0404* | (2017.01) |
| *H04L 5/00* | (2006.01) |
| *H04W 40/16* | (2009.01) |

(52) U.S. Cl.
CPC ...... *H04W 28/0263* (2013.01); *H04B 7/0404* (2013.01); *H04L 5/005* (2013.01); *H04L 5/0014* (2013.01); *H04L 5/0051* (2013.01); *H04L 27/2646* (2013.01); *H04W 40/16* (2013.01); *H04L 5/006* (2013.01); *H04L 27/2666* (2013.01)

(58) Field of Classification Search
CPC ....... H04L 27/2613; H04L 2025/03796; H04L 27/2646; H04L 27/2666; H04J 11/0079; H04W 72/04; H04W 72/005; H04W 72/1257; H04W 76/046; H04W 28/00; H04W 40/16
See application file for complete search history.

(56) References Cited

U.S. PATENT DOCUMENTS

| | | | |
|---|---|---|---|
| 2010/0273499 A1* | 10/2010 | van Rensburg | H04W 72/1231 455/450 |
| 2013/0301604 A1* | 11/2013 | Skov | H04L 5/0023 370/329 |
| 2014/0112248 A1 | 4/2014 | Bergman et al. | |
| 2014/0341114 A1* | 11/2014 | Seo | H04L 5/0053 370/328 |

* cited by examiner

*Primary Examiner* — Salvador E Rivas
(74) *Attorney, Agent, or Firm* — Baker Botts LLP

(57) ABSTRACT

According to some embodiments, a method of adapting reference signals of a wireless network comprises establishing a first wireless connection with a first user equipment. The first wireless connection is associated with one or more references signals and each of the one or more reference signals is associated with one or more antenna ports. The method further comprises mapping one of the one or more reference signals associated with one or more antenna ports to at least two antenna port reference signal resources (APRSR) for the first user equipment, wherein the APRSR comprises a pair of consecutive time-frequency resource elements of a radio subframe of the first wireless connection.

21 Claims, 7 Drawing Sheets

REFERENCE SIGNAL DENSITY ADAPTATION

TECHNICAL FIELD

Particular embodiments relate generally to reference signals in wireless communications, and more particularly to reference signal density adaptation.

BACKGROUND

In current releases of Third Generation Partnership Project (3GPP) Long Term Evolution (LTE), cell-specific reference symbols (CRS) may be used to assist in downlink channel estimation. CRS may also be used for mobility measurements and for uplink power control performed by User Equipment (UE). CRS were designed to be used both for demodulation and channel state information (CSI) feedback purposes. CRS exist in all subframes and are transmitted according to a fixed pattern. Release 10 of LTE introduced a reference signal specifically for CSI purposes referred to as CSI-RS. By measuring on a CSI-RS reference signal, a UE may estimate an effective channel the reference signal is traversing. The estimation may include the radio propagation channel, antenna gains, and possible antenna virtualizations. A CSI-RS port may be precoded so that it is virtualized over multiple physical antenna ports. That is, the CSI-RS port may be transmitted on multiple physical antenna ports, possibly with different gains and phases. LTE also supports UE-specific reference signals designed for assisting in channel estimation for demodulation purposes.

CSI-RS may not be transmitted in every subframe and CSI-RS are generally sparser in time and frequency than reference signals used for demodulation. CSI-RS transmissions may occur every 5th, 10th, 20th, 40th, or 80th subframe according to an RRC configured periodicity parameter and an RRC configured subframe offset.

A base station may request a UE operating in connected mode to perform channel state information (CSI) reporting based on received CSI-RS. Such reporting may include a suitable rank indicator (RI), one or more precoding matrix indices (PMIs), and/or a channel quality indicator (CQI). Other types of CSI may include explicit channel feedback and interference covariance feedback. The CSI feedback assists the base station in scheduling. For example, the CSI helps the base station to determine a subframe and resource blocks for a transmission and to determine which transmission scheme and precoder to use. The CSI also provides information on a proper user bit rate for a transmission (link adaptation).

In LTE, both periodic and a-periodic CSI reporting may be supported. For periodic CSI reporting, a UE reports the CSI measurements at a configured, periodic time on the physical uplink control channel (PUCCH). For a-periodic reporting, the CSI feedback is transmitted on the physical uplink shared channel (PUSCH) at a pre-specified time instant after receiving a CSI trigger (e.g., as part of the uplink grant) from a base station. Using a-periodic CSI reports, a base station may dynamically request CSI that reflects downlink radio conditions in a particular subframe.

The RI corresponds to a UE selected number of streams that are to be spatially multiplexed and transmitted in parallel over an effective channel. The PMI identifies a UE selected precoder (in a codebook) for the transmission. The precoder corresponds to a spatial transmission property. The CQI represents a UE selected highest transport format given block error rate (BLER) typically no higher than 10% on the CSI reference resource. Thus, there is a relation between a CQI and a signal to interference plus noise ratio (SINR) of the spatial stream(s) over which the transport block is transmitted.

Reference signals may occupy particular pairs of adjacent time-frequency resource elements within a resource block pair. A pair of adjacent time-frequency resource elements may be referred to as an antenna port reference signal resource (APRSR). The particular APRSRs comprising the reference signal may be referred to as a reference signal configuration. For example, a two-antenna-port CSI-RS configuration may comprise one APRSR. A four-antenna-port CSI-RS configuration may comprise two APRSR. Multiple reference signal resource configurations may form a particular pattern within a particular subframe. In general, time-frequency resource elements associated with a reference signal may be referred to as reference signal resources.

A particular type of CSI-RS may be referred to as zero-power (ZP) CSI-RS (also referred to as muted resource elements) in which no PDSCH signal is transmitted on the CSI-RS resources. ZP-CSI-RS corresponds to a CSI-RS pattern whose time-frequency resource elements are silent. The PDSCH is thus effectively mapped around the ZP-CSI-RS, and the network is free to transmit any signal on the ZP-CSI-RS. Such silent patterns are configured with a smallest resolution of four time-frequency resource elements.

One purpose of ZP-CSI-RS is to raise the SINR for CSI-RS in a cell by configuring ZP-CSI-RS in interfering cells so that time-frequency resource elements that would normally cause interference are silent. A CSI-RS pattern in a particular cell may be matched with a corresponding ZP-CSI-RS pattern in an interfering cell. Raising the SINR level for CSI-RS measurements may be beneficial in applications such as coordinated multi point (CoMP) or in heterogeneous deployments. In joint transmission CoMP, a UE will likely need to measure a channel from non-serving cells, and interference from the much stronger serving cell would be destructive. ZP-CSI-RS may also be used in heterogeneous deployments where ZP-CSI-RS is, configured in a macro-layer so that it coincides with CSI-RS transmissions in a pico-layer. This may avoid strong interference from macro nodes when UEs measure the channel to a pico node.

The PDSCH is mapped around the resource elements occupied by CSI-RS and ZP-CSI-RS so both the network and the UE should be aware of the CSI-RS/ZP-CSI-RS configuration or else the UE may not be able to decode the PDSCH in subframes containing CSI-RS or their ZP counterparts.

LTE Release 11 introduced CSI interference measurement (IM) functionality where the network is able to configure a UE to measure interference on a particular set of resource elements. The network may control the interference seen on a CSI-IM, for example, by muting all transmission points within a coordination cluster on the CSI-IM. In such a scenario, the UE will effectively measure the inter CoMP cluster interference. In this manner, an eNodeB may evaluate the performance of a UE given different CoMP transmission hypotheses. The system may also track or estimate different intra-cluster interference levels corresponding to different transmission and blanking hypotheses. By configuring resources that a UE is using for measuring interference plus noise (e.g., a CSI-IM), a UE may assume that no transmission points of interest are transmitting on that resource, and the received power may be used as a measure of the interference plus noise.

In uncoordinated systems, a UE may measure the interference observed from other transmission points (or other cells). The measured interference corresponds to a relevant interference level in an upcoming data transmission.

In coordinated systems, the network may control which transmission points that may possibly interfere with a UE. Multiple interference hypotheses may exist depending on which transmission points are transmitting data to other UEs. The network may also choose to transmit interference from specific transmission points for the sole purpose of testing how that particular interference hypothesis affects a UE (as seen via the CSI feedback). The network may also asses which hypothesis is most likely to occur for upcoming transmission time intervals. This may be referred to as a traffic hypothesis. For UEs that are on the boundaries of a coordination area, the dominant interferers may not be found within the coordinated transmission points but instead from outside the cluster. This inter-cluster interference (ICI) may not be controlled and may impact CSI reports in an unknown way.

In LTE Release 11, CSI processes are defined such that each CSI process is associated with a CSI-RS resource configuration and a CSI-IM resource configuration. The network may configure a UE in transmission mode 10 with one to four CSI processes. A CSI reported by the UE is associated with a particular CSI process. The network may test different interference scenarios simultaneously on the UE using the four CSI (spanning maximally three different CSI-IMs). Based on the UE report feedback, the network may adopt a particular transmission scheme.

SUMMARY

According to some embodiments, a method of adapting reference signals of a wireless network comprises establishing a first wireless connection with a first user equipment. The first wireless connection is associated with one or more references signals and each of the one or more reference signals is associated with one or more antenna ports. The method further comprises mapping one of the one or more reference signals associated with one or more antenna ports to at least two antenna port reference signal resources (APRSR) for the first user equipment, wherein the APRSR comprises a pair of consecutive time-frequency resource elements of a radio subframe of the first wireless connection.

According to some embodiments, each of the APRSR in the mapping of reference signals, antenna ports, and APRSR is associated with one reference signal configuration. The reference signal configuration comprises a predetermined pattern of one or more APRSR. The number of antenna ports, N(ap), in the mapping of reference signals, antenna ports, and APRSR is less than or equal to the number of APRSR, N(r), in the associated reference signal configuration.

According to some embodiments, the APRSR in the mapping of reference signals, antenna ports, and APRSR are associated with at least two reference signal configurations. Each reference signal configuration comprises a predetermined pattern of one or more APRSR. The number of reference signal configurations, N(rsc), associated with the APRSR in the mapping of reference signals, antenna ports, and APRSR is less than the number of antenna ports, N(ap), in the mapping.

According to some embodiments, the method includes mapping one of the one or more reference signals associated with one or more antenna ports to at least one APRSR for a second user equipment, wherein the at least one APRSR for the second user equipment is the same APRSR as at least one of the APRSR for the first user equipment. The method further includes transmitting, to the second user equipment, the mapping of reference signals, antenna ports, and APRSR for the second user equipment.

According to some embodiments, the mapping of reference signals, antenna ports, and APRSR for the first user equipment is associated with a first subframe of the first wireless connection. The method further includes mapping one of the one or more reference signals associated with one or more antenna ports to at least one APRSR for the first user equipment associated with a second subframe of the first wireless connection an transmitting the mapping of reference signals, antenna ports, and APRSR associated with the first subframe and the second subframe to the first user equipment.

According to some embodiments, a method of adapting reference signals of a wireless network comprises establishing a wireless connection with a radio network node. The wireless connection is associated with one or more references signals and each of the one or more reference signals is associated with one or more antenna ports. The method further comprises receiving a first mapping of one of the one or more reference signals associated with one or more antenna ports to at least two APRSR for the wireless connection from the radio network node, wherein the APRSR comprises a pair of consecutive time-frequency resource elements of a radio subframe of the wireless connection.

Particular embodiments may exhibit some of the following technical advantages. Particular embodiments may facilitate reference signals transmitted with a density that enables channel estimation performance to be tailored to the needs of a specific UE. Link performance may be used more efficiently to improve overall system performance. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

While some UEs may experience good channel quality and are able to accurately estimate a channel on an available CSI-RS, other UEs may experience disadvantageous radio conditions. If a CSI-RS exhibits a low SINR, a UE's channel estimation ability based on the CSI-RS may degrade. The effective processing gain may be insufficient to achieve a useable channel quality. If full coordination is present between cells, ZP-CSI-RS may be used to mute heavily-interfering surrounding cells. However, a multitude of cells may require muting, which would reduce the number of available PDSCH resource elements resulting in increased overhead. If the interfering cells are not in a coordination cluster, then using ZP-CSI-RS to protect particular users becomes more difficult.

Although CSI-RS may be configured using dedicated RRC, they are usually setup by the network in a cell and/or transmission point specific manner. The configuration of which reference signals to measure on may be statically configured based on the number of antenna ports used by an eNB.

A proposal applicable to measuring CSI-RS received power (CSI-RSRP) includes transmitting CSI-RS in bursts of consecutive subframes with a set periodicity. This method may improve the density of the CSI-RS, which may be useful for bias removal related to RSRP measurements. This method, however, is not flexible and is not tailored to specific UEs' needs in terms of the quality of CSI estimation.

An object of the present disclosure is to obviate at least these disadvantages and provide an improved method to transmit reference signals with a density that enables channel estimation performance to be tailored to the needs of specific UEs. The reference signal resources used for channel estimation may be configurable.

Particular embodiments are described in FIGS. 1-9 of the drawings, like numerals being used for like and corresponding parts of the various drawings. LTE is used throughout this disclosure as an example cellular system, but the ideas presented herein apply to any wireless communication system.

Figure 1:
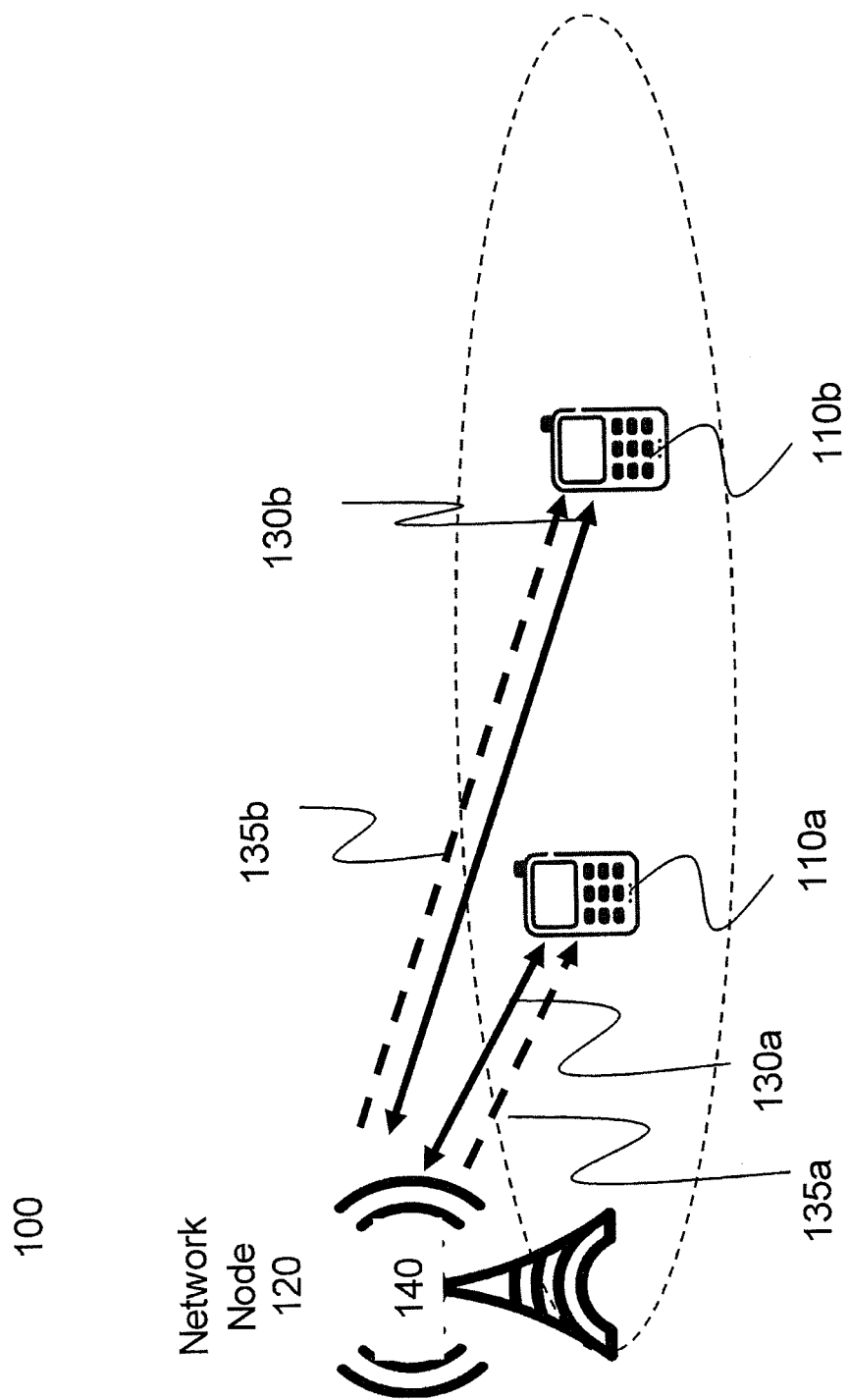
FIG. 1 is a block diagram illustrating an example of a network, according to a particular embodiment.

FIG. 1 is a block diagram illustrating an example of a network, according to a particular embodiment. Network 100 includes radio network node 120 (such as a base station or eNodeB) and wireless devices 110 (such as mobile phones, smart phones, laptop computers, tablet computers, or any other devices that can provide wireless communication). In general, wireless devices 110 that are within coverage of radio network node 120 communicate with radio network node 120 by transmitting and receiving wireless signals 130. For example, wireless devices 110 and radio network node 120 may communicate wireless signals 130 containing voice traffic, data traffic, and/or control signals. Wireless signals 130 may include both downlink transmissions (from radio network node 120 to wireless devices 110) and uplink transmissions (from wireless devices 110 to radio network node 120). As part of a downlink transmission, radio network node 120 may transmit one or more reference signals 135, such as CSI-RS, to wireless device 110. In particular embodiments, wireless device 110 may use reference signal 135 for measuring downlink channel quality.

Radio network node 120 transmits and receives wireless signals 130 using antenna 140. In particular embodiments, radio network node 120 may comprise multiple antennas 140. For example, radio network node 120 may comprise a multi-input multi-output (MIMO) system with two, four, or eight antennas 140.

In network 100, each radio network node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8 below. Similarly, a radio network node may include any suitable combination of hardware and/or software. For example, in particular embodiments, a radio network node, such as radio network node 120, may include the components described with respect to FIG. 9 below.

Figure 2:
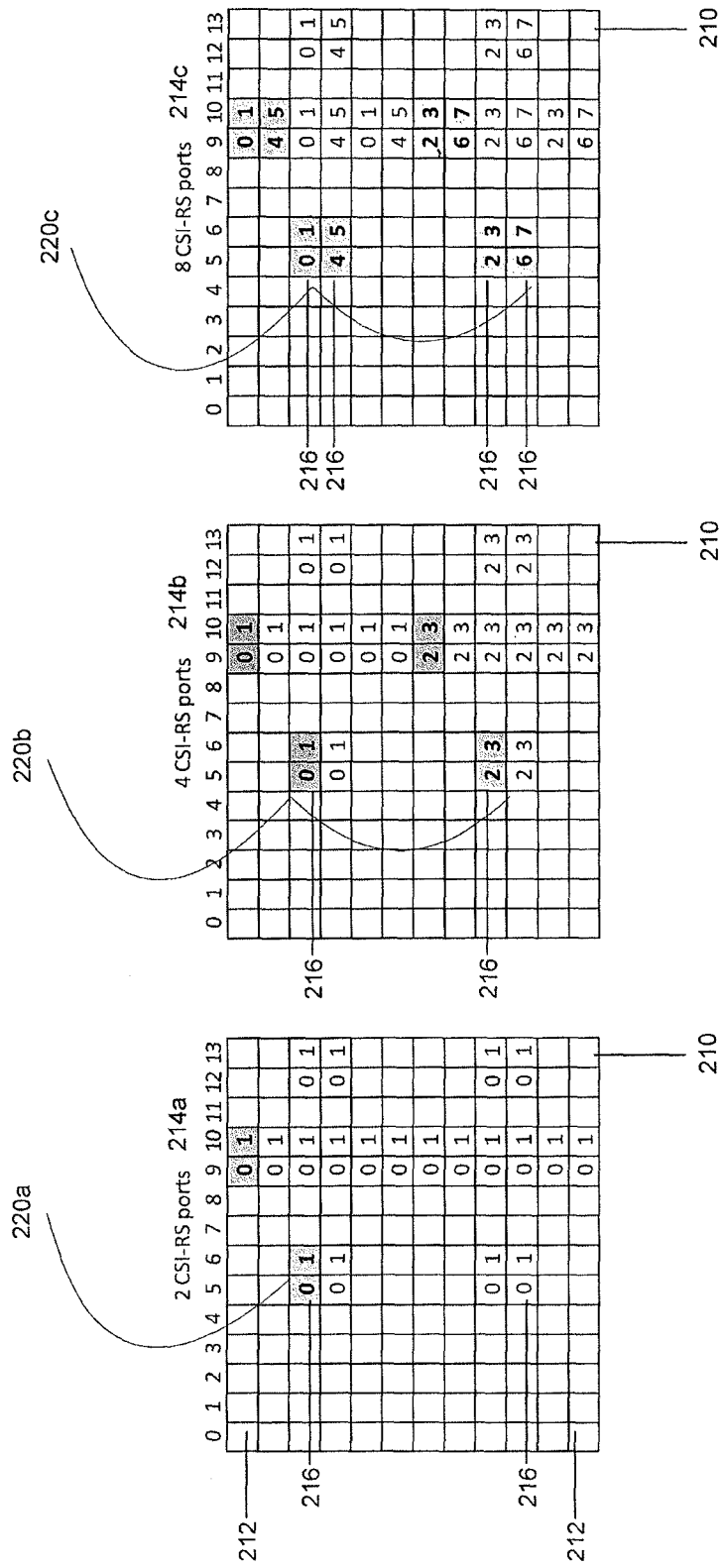
FIG. 2 is an example resource element grid showing potential positions for reference signals, according to a particular embodiment.

FIG. 2 is an example resource element grid showing potential positions for reference signals, according to a particular embodiment. FIG. 2 illustrates three example subframes 210. Each subframe 210 comprises a plurality of time-frequency resource elements 212. In particular embodiments, subframe 210 comprises twelve resource elements 212 in the frequency domain and fourteen resource elements in the time domain.

Particular time-frequency resource elements 212 within subframe 210 may be allocated for transmission of reference signals 135, such as CSI-RS. In particular embodiments, time-frequency resource elements 212 for transmission of reference signals 135 may comprise a pattern of time-frequency resource elements 212 within subframe 210.

In particular embodiments, reference signal 135 transmission, such as CSI-RS transmission, may use an orthogonal cover code of length two to overlay two antenna ports on two consecutive time-frequency resource elements 212. The two consecutive time-frequency resource elements 212 comprise an antenna port reference signal resource (APRSR) 216 (examples are illustrated by pairs of consecutive time-frequency resource elements 212 with labels 0 and 1, 2 and 3, 4 and 5, or 6 and 7). Different reference signal configurations 220 are available depending on the number of antenna ports transmitting reference signals 135. For example, a two-antenna-port reference signal configuration 220a may comprise a single APRSR 216, a four-antenna-port reference signal configuration 220b may comprise two APRSR 216, and an eight-antenna-port reference signal configuration 220c may comprise four APRSR 216.

In particular embodiments, the pattern of time-frequency resource elements 212 for transmission of reference signals 135 may comprise the illustrated pattern of numbered time-frequency resource elements 212 in the time domain columns numbered 5, 6, 9, 10, 12, and 13 of each subframe 210. In particular embodiments, the pattern of time-frequency resource elements 212 for transmission of reference signals 135 may use any available time-frequency resource elements 212.

Each subframe 210 may comprise a pattern of reference signal configurations 220. Patterns 214a, 214b, and 214c illustrate example reference signal transmission patterns for two, four, and eight antenna ports, respectively. In other embodiments, such as a time division duplexing (TDD) embodiment, other patterns are available.

Pattern 214a illustrates a pattern of twenty possible two-antenna-port reference signal configurations 220a for subframe 210 for transmitting reference signal 135. For example, CSI-RS for two antenna ports 0 and 1 may be transmitted using reference signal configuration 220a, which comprises a single APRSR 216. The time-frequency location of twenty reference signal configuration 220a possibilities are illustrated within subframe 210 for pattern 214a. Each of the twenty reference signal configuration 220a possibilities may be referred to as a separate reference signal configuration 220. Similarly, reference signal configurations 220a at the same time-frequency location within a subframe, but in separate subframes, may also be referred to as separate reference signal configurations 220.

Pattern 214b illustrates a pattern of ten possible four-antenna-port reference signal configurations 220b for subframe 210 for transmitting reference signal 135. For example, CSI-RS for four antenna ports 0, 1, 2 and 3 may be transmitted using reference signal configuration 220b, which comprises two APRSR 216. The two APRSR 216 are separated by five resource elements in the frequency domain. Antenna ports 0 and 1 transmit in the first APRSR 216, and antenna ports 2 and 3 transmit in the second APRSR 216.

Pattern 214c illustrates a pattern of five possible eight-antenna-port reference signal configurations 220c for subframe 210 for transmitting reference signal 135. For example, CSI-RS for eight antenna ports 0, 1, 2, 3, 4, 5, 6, and 7 may be transmitted using reference signal configuration 220c, which comprises four APRSR 216. A first pair of APRSR 216 are adjacent in the frequency domain (0 and 1, and 4 and 5, as illustrated) and a second pair of APRSR 216 are adjacent in the frequency domain (2 and 3, and 6 and 7, as illustrated) and separated from the first pair by five resource elements in the frequency domain.

Disadvantages associated with statically configured reference signal resources were discussed above. Particular advantages may be realized by a radio network node able to dynamically configure resources used for transmission of reference signals, such as CSI-RS. For example, a radio network node may configure reference signal resources to transmit CSI-RS with a density that enables channel estimation performance to be tailored to the needs of specific UEs.

Dynamic configuration of reference signal resources may be considered in two parts. The first part relates to configuring the transmission of reference signals from the network side. The second part relates to configuring a UE to associate the appropriate time-frequency resource elements with a particular antenna port for performing reference signal measurements.

In a particular embodiment, the network may configure one or more APRSR for transmitting a reference signal to be transmitted on the same antenna port, providing a denser reference signal. For example, the network may use CSI feedback as well as RSRP reports to determine which UEs are in a need of denser CSI-RS. As a particular example, a first of the available five reference signal configurations 220c of the eight antenna port CSI-RS pattern 214c of FIG. 2 may be used to transmit reference signals from only two antenna ports (e.g., 0 and 1) for CSI feedback purpose. An example is illustrated in FIG. 3.

Figure 3:
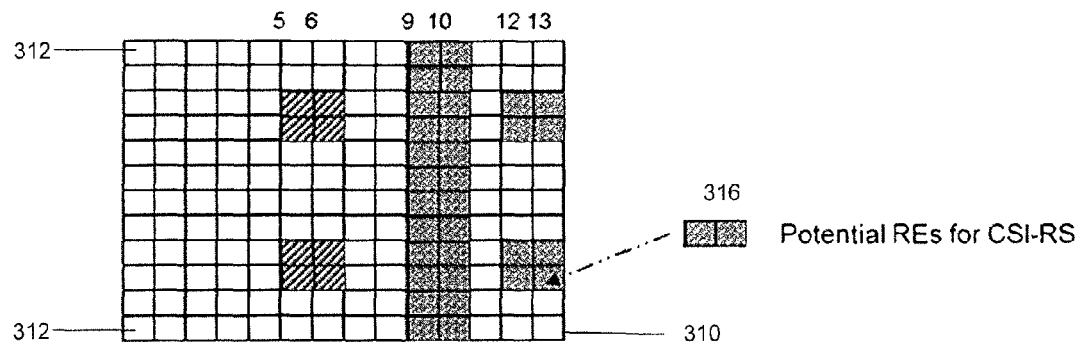
FIG. 3 is an example resource configuration for eight antenna ports, according to a particular embodiment.

FIG. 3 is an example resource configuration for eight antenna ports, according to a particular embodiment. FIG. 3 illustrates an example subframe 310 comprising time-frequency resource elements 312, APRSR 316, and reference signal configurations 320c similar to elements 210, 212, 216 and 220c described in reference to FIG. 2 above.

In particular embodiments, a radio network node may instruct wireless device to measure for a reference signal on an eight-port reference signal configuration (comprising four APRSR) and that the reference signal is associated with two antenna ports. Consequently, the wireless device measures a reference signal that represents an equivalent two-antenna-port reference signal, but with four times the density in number of pilots. For example, radio network node 120 may instruct wireless device 110 to measure for CSI-RS 135 on eight-port reference signal resource 320c and that CSI-RS 135 is associated with two antenna ports 0 and 1 (i.e., each of the four APRSR 316 is associated with antenna ports 0 and 1). In particular embodiments, wireless network node 120 transmits CSI-RS 135 to wireless device 110 in accordance with the configuration information transmitted to wireless device 110. In this example embodiment, wireless device 110 may increase, by a factor of four, its effective processing gain for the channel estimation on the two reference signals.

In particular embodiments, a radio network node may send the reference signal configuration information to a wireless device using a configuration message such as a radio resource control (RRC) message, a media access control (MAC) control element (CE), a dynamically signaled message using a layer 1 control channel such as PDCCH and/or ePDCCH, or any other suitable control channel between a radio network node and a wireless device.

In another embodiment, the network may transmit two reference signals on two reference signal configurations to a wireless device, and the network may instruct the wireless device that the two reference signals originate from the same antenna port. An example is illustrated in FIG. 4.

Figure 4:
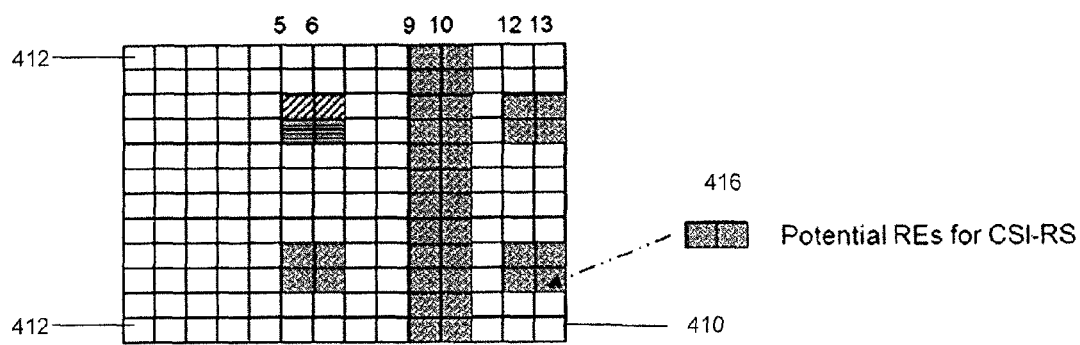
FIG. 4 is an example resource configuration for two antenna ports, according to a particular embodiment.

FIG. 4 is an example resource configuration for two antenna ports, according to a particular embodiment. FIG. 4 illustrates an example subframe 410 comprising time-frequency resource elements 412, APRSR 416, and reference signal configurations 420a similar to elements 210, 212, 216, and 220a described in reference to FIG. 2 above.

In particular embodiments, a radio network element may use the same antenna port (e.g., port 0) to transmit two references signals on two reference signal configurations. The radio network element may communicate the reference signal configuration information to a wireless device so that wireless device may measure the reference signals accordingly.

For example, radio network element 120 may indicate to wireless device 110 that CSI-RS 135 transmitted on a first reference signal configuration 420a and CSI-RS 135 transmitted on a second reference signal configuration 420a share the same antenna port. In particular embodiments, radio network element 120 may indicate to wireless device 110 that two reference signals 135 are co-located or quasi co-located and they may be estimated jointly for improved processing gain.

In particular embodiments, a radio network element may transmit reference signals according to a particular configuration and configure multiple wireless devices to interpret the configuration differently. For example, a radio network element may transmit reference signals on a first and second reference signal configuration. The radio network element may communicate reference signal configuration information to a first wireless device indicating that the first wireless device should measure both reference signals on both the first and second reference signal resources and treat the reference signals as originating from the same antenna port. The radio network element may also communicate reference signal configuration information to a second wireless device indicating that the second wireless device should measure a single reference signal on the first reference signal resource. In particular embodiments, the radio network element may indicate that the second wireless device should measure both reference signals on both reference signal resources, but not assume that the two reference signal resources share the same antenna port.

In particular embodiments, configuring two reference signals with different periodicity in time may make the density of the pilots representing the associated antenna ports periodic. Such an embodiment may be advantageous in a scenario where the network has identified specific wireless devices that achieve insufficient quality in their CSI channel estimates. These wireless devices may be configured to report CQI measured on subframes with a periodically high density of pilot symbols. Other wireless devices not prone to insufficient channel estimation quality may use all subframes for which any of the reference signal transmissions occur, and may therefore report CQI at a higher rate. A particular advantage is the possibility of sacrificing measurement and reporting rate for some wireless devices in return for better accuracy for those wireless devices when they do measure and report. The needs of both high SINR wireless devices and low SINR wireless devices may be fulfilled at a lower cost in pilot overhead. An example embodiment is illustrated in FIG. 5.

Figure 5:
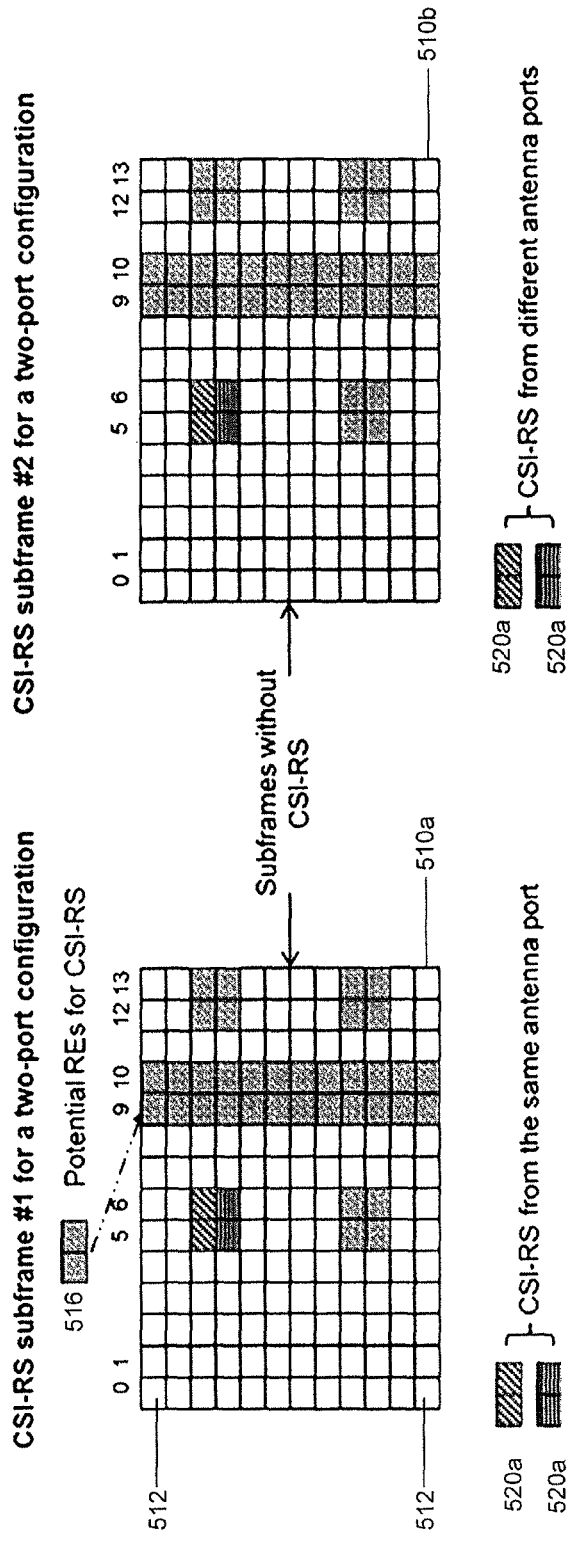
FIG. 5 is an example resource configuration for two antenna ports over multiple subframes, according to a particular embodiment.

FIG. 5 is an example resource configuration for two antenna ports over multiple subframes, according to a particular embodiment. FIG. 5 illustrates two example subframes 510a and 510b comprising time-frequency resource elements 512, APRSR 516, and reference signal resources 520a similar to elements 210, 212, 216 and 220a described in reference to FIG. 2 above. Subframes 510a and 510b are separated by some amount of time. Any number of subframes 510 may be transmitted between subframes 510a and 510b.

In particular embodiments, reference signals 135 may be configured with different periodicity in time on different reference signal configurations 520. Between subframes 510a and 510b may be any number of frames where wireless device 110 does not measure CSI. The proposed periodicity enables wireless devices 110 with bad channel quality to estimate CQI in subframe 510a, and wireless devices 110 with good channel quality to measure on more antenna ports in subframe 510b.

For example, radio network element 120 may transmit CSI-RS 135 on a first reference signal configuration 520a and a second reference signal configuration 520a. Radio network element 120 may communicate to first wireless device 110, which may be experiencing relatively high interference levels, that first wireless device 110 should measure CSI-RS 135 on both first and second reference signal configurations 520a and treat both CSI-RS 135 as originating from antenna port 0. Radio network element 120 may also communicate to second wireless device 110, which may be experiencing relatively low interference levels, that second wireless device 110 should measure CSI-RS 135 on first reference signal configuration 520a. In particular embodiments, radio network element 120 may communicate to second wireless device 110 that second wireless device 110 should measure CSI-RS 135 on both reference signal configurations 520a, but not assume that both CSI-RS 135 share the same antenna port.

Such embodiments may be advantageous if the network exhibits an interference situation that is specific to different subframes. For example, in a multicast-broadcast single-frequency network (MBSFN) a transmission may be recurrently sent from neighboring cells where ZP-CSI-RS are not transmitted. If CSI-RS are transmitted in an equivalent subframe, the MBSFN transmission may interfere with the channel estimate. The detriment to the channel estimates may be offset by measuring in a subframe with increased CSI-RS density during those subframes. Similarly, when using a pattern of almost blank subframes (ABS) to protect users served by low power nodes, a large differential may exist between ABS and non-ABS subframes that may warrant an improved processing gain.

As briefly described above, signaling of the grouping of different reference signal patterns and configurations into a set of antenna ports may be performed dynamically. In particular embodiments, special bit(s) may be added to existing signaling for this purpose, or existing free code points may be reused, such as free code points in the DCI formats for downlink assignments or uplink grants. In particular embodiments, two bits in the downlink DCI format referred to as the PQI table may be used for signaling. Each of the four states of the PQI table may be RRC configured to correspond to certain PDSCH to resource grid mappings and quasi-co-location properties. In particular embodiments, the meaning of a state may be altered by RRC configuration to include signaling for reference signal to antenna port mappings.

In particular embodiments, the dynamic signaling message may inform a wireless device that CSI-RS signals in a certain subframe are mapped to a set of antenna ports as described above. Furthermore, a rule based on the timing of the dynamic signaling message may specify that the configuration applies to a particular subframe. For example, the configuration may apply to the first subframe containing the relevant CSI-RS signals that occurs after the subframe containing the dynamic signaling message is received by the wireless device. In particular embodiments, such a rule may be based on timing of the CSI reference resource. For example, a rule may specify a wireless device should apply the configured mapping to the latest subframe containing the relevant (NZP) CSI-RS on or before the subframe containing the CSI reference resource.

In reference to dynamic signaling, particular advantages may be realized if wireless devices do not interpolate CSI-RS based channel estimates across subframes. Such interpolation may complicate determination of how switching antenna port to reference signal pattern mapping may affect various wireless devices in the network.

In particular embodiments, a dynamically signaled reference signal to antenna port mapping message may be sent as a broadcast message. A particular advantage such an embodiment is to avoid sending the same message to multiple wireless devices that all measure on the same reference signals.

In particular embodiments, the network may use UE-specific Quality-of-Service (QoS) parameters to configure CSI-RS resources such that UEs belonging to different QoS levels measure on resources with different pilot density.

In particular embodiments, the network may configure CSI-RS resources according to UE mobility parameters, such as UE speed, Doppler shift, or position relative to cell boundaries.

Although particular patterns of APRSR and reference signal configurations are illustrated in FIGS. 2-5 with respect to certain time domain column locations and certain frequency domain row locations, in some embodiments any suitable time-frequency locations within a subframe may be used as APRSR and reference signal configurations.

Figure 6:
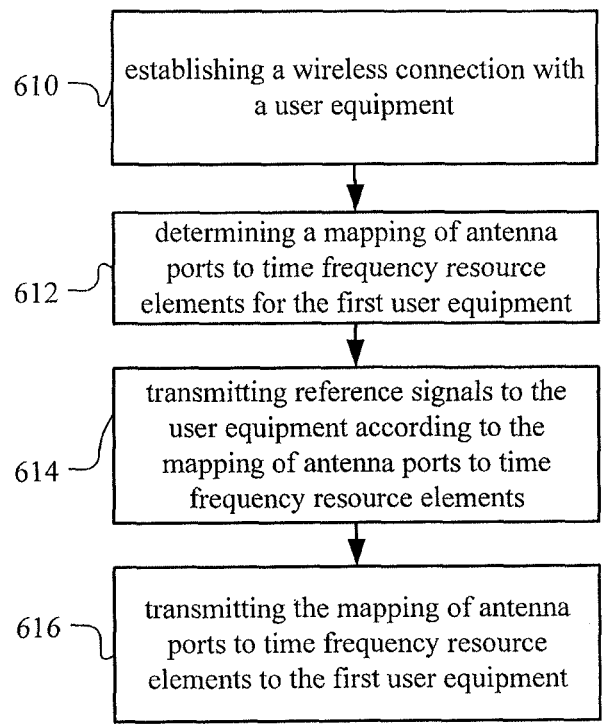
FIG. 6 is a flowchart of an example method of adapting reference signals in a radio network node, according to a particular embodiment.

FIG. 6 is a flowchart of an example method 600 of adapting reference signals in a radio network node, according to a particular embodiment. In particular embodiments, one or more steps of method 600 may be performed by components of network 100 described with reference to FIGS. 1-5.

The method begins at step 610, where a radio network node establishes a wireless connection with a wireless device. For example, radio network node 120 may establish a wireless connection 130 with wireless device 110. In particular embodiments, wireless connection 130 may include CSI-RS 135.

At step 612, the radio network node determines a mapping of antenna ports to time-frequency resource elements for the wireless device. For example, radio network node 120 may determine a mapping similar to those described in reference to FIGS. 3-5 above. In particular embodiments, the mapping of antenna ports to APRSR may be based on interference patterns present in network 100. In particular embodiments, interference patterns may be determined by current CSI-RS measurement reports and a new mapping of antenna ports to APRSR may be determined in response to the current measurements. In particular embodiments, the mapping of antenna ports to APRSR may be periodic.

At step 614, the radio network node transmits reference signals to the wireless device according to the mapping of antenna ports to APRSR. For example, radio network node 120 may transmit CSI-RS 135 to wireless device 110 according to a mapping determined in step 612. In particular embodiments, the transmission may vary periodically based on a periodic configuration.

At step 616, the radio network node transmits the mapping of antenna ports to APRSR to the wireless device. The wireless device uses the mapping to accurately measure and report the received reference signals. For example radio network node 120 may transmit a mapping determined in step 612 to wireless device 110. Wireless device 110 may measure and report CSI-RS 135 based on the received mapping. In particular embodiments, the mapping of antenna ports to APRSR may be dynamically signaled to wireless device 110 using any of the dynamic signaling methods described above.

Modifications, additions, or omissions may be made to method 600. Additionally, one or more steps in method 600 of FIG. 6 may be performed in parallel or in any suitable order. For example, steps 614 and 616 may be performed in parallel or reverse order. Steps 610 to 616 may be repeated as necessary over time, such as upon detection of a change in interference patterns.

Figure 7:
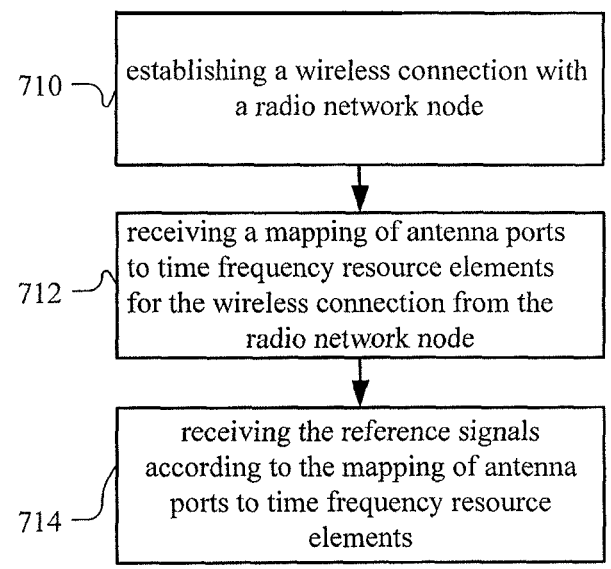
FIG. 7 is a flowchart of an example method of adapting reference signals in a wireless device, according to a particular embodiment.

FIG. 7 is a flowchart of an example method 700 of adapting reference signals in a wireless device, according to a particular embodiment. In particular embodiments, one or more steps of method 700 may be performed by components of network 100 described with reference to FIGS. 1-5.

The method begins at step 710, where a wireless device establishes a connection with a radio network node. For example, wireless device 110 may establish a wireless connection 130 with radio network node 120. In particular embodiments, wireless connection 130 may include CSI-RS 135.

At step 712, the wireless device receives a mapping of antenna ports to APRSR from the radio network node. For example, wireless device 110 may receive, from radio network node 120, a mapping similar to those described in reference to FIGS. 3-5 above. In particular embodiments, wireless device 110 may receive the mapping transmitted by network node 120 at step 616 described in reference to FIG. 6 above.

At step 714, the wireless device receives the reference signals according to the mapping of antenna ports to APRSR. For example, wireless device 110 may receive CSI-RS 135 from radio network node 120 according to a mapping received in in step 712. In particular embodiments, the transmission may vary periodically based on a periodic configuration. In particular embodiments, the received reference signal may be the reference signal transmitted by radio network node 120 at step 614 described in reference to FIG. 6 above.

Modifications, additions, or omissions may be made to method 700. Additionally, one or more steps in method 700 of FIG. 7 may be performed in parallel or in any suitable order. For example, steps 712 and 714 may be performed in parallel or reverse order. Steps 710 to 714 may be repeated as necessary over time.

Figures 8, 9:
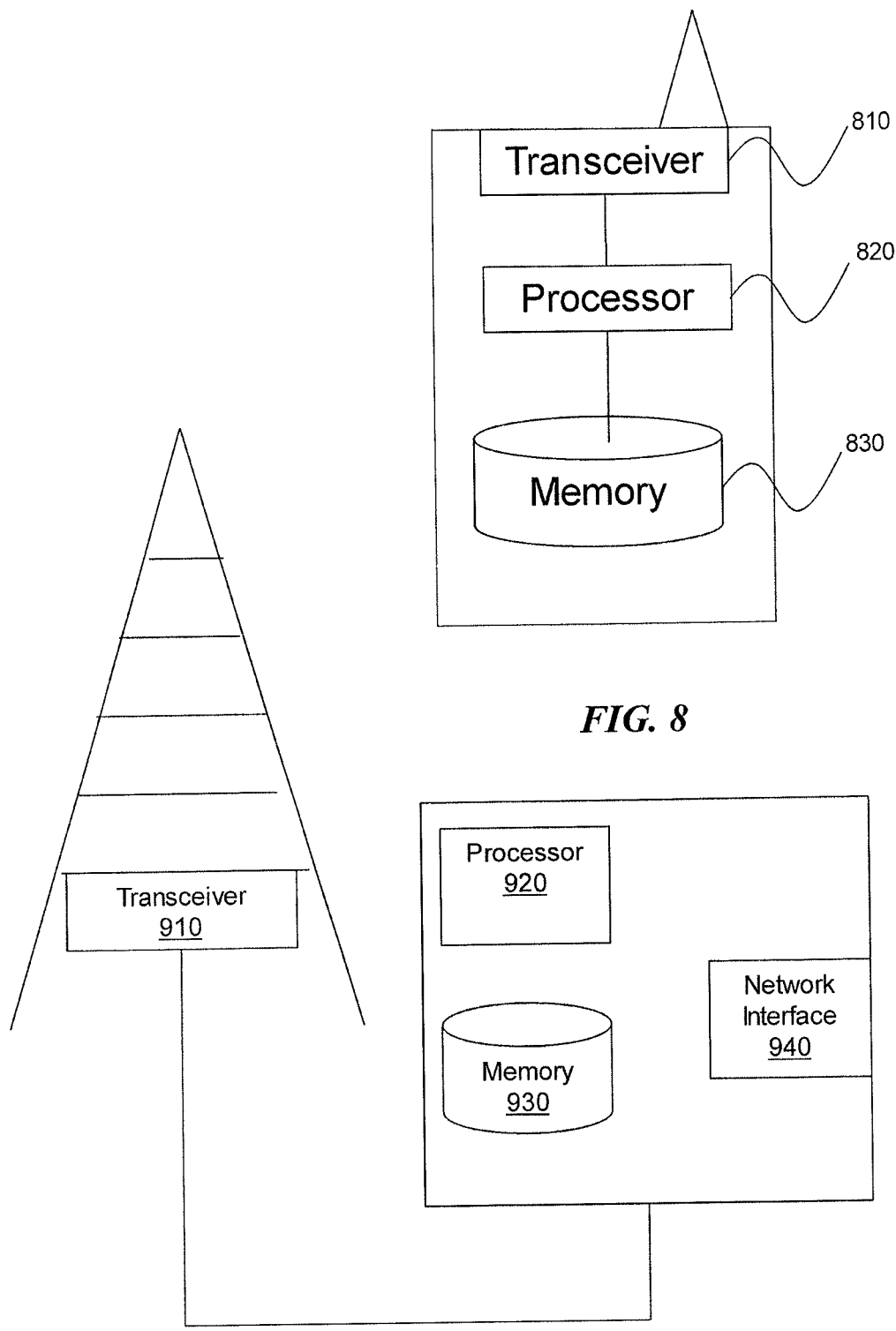
FIG. 8 is a block diagram illustrating an example embodiment of a wireless device.
FIG. 9 is a block diagram illustrating an example embodiment of a radio network node.

FIG. 8 is a block diagram illustrating an example embodiment of a wireless device. The wireless device is an example of the wireless devices 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 810, processor 820, and memory 830. In some embodiments, transceiver 810 facilitates transmitting wireless signals to and receiving wireless signals from wireless network node 120 (e.g., via an antenna), processor 820 executes instructions to provide some or all of the functionality described herein as provided by the wireless device, and memory 830 stores the instructions executed by processor 820.

Processor 820 includes any suitable combination of hardware and software implemented in one or more integrated circuits or modules to execute instructions and manipulate data to perform some or all of the described functions of the wireless device. Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 820 in communication with transceiver 810 receives CSI-RS 135 from radio network node 120. Other embodiments of the wireless device may include additional components (beyond those shown in FIG. 8) responsible for providing certain aspects of the wireless device's functionality, including any of the functionality described above and/or any additional functionality (including any functionality necessary to support the solution described above).

FIG. 9 is a block diagram illustrating an example embodiment of a radio network node. Radio network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Radio network node 120 includes at least one transceiver 910, at least one processor 920, at least one memory 930, and at least one network interface 940. Transceiver 910 facilitates transmitting wireless signals to and receiving wireless signals from a wireless device, such as wireless devices 110 (e.g., via an antenna); processor 920 executes instructions to provide some or all of the functionality described above as being provided by a radio network node 120; memory 930 stores the instructions executed by processor 920; and network interface 940 communicates signals to backend network components, such as a gateway, switch, router, Internet, Public Switched Telephone Network (PSTN), controller, and/or other radio network nodes 120. Processor 920 and memory 930 can be of the same types as described with respect to processor 820 and memory 830 of FIG. 8 above.

In some embodiments, network interface 940 is communicatively coupled to processor 920 and refers to any suitable device operable to receive input for radio network node 120, send output from radio network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

In particular embodiments, processor 920 determines a mapping of antenna ports to time-frequency resource elements. In particular embodiments, processor 920 in communication with transceiver 910 transmits, to wireless device 110, the determined mapping of antenna ports to time-frequency resource elements. In particular embodiments, processor 920 in communication with transceiver 910 transmits CSI-RS 135 to wireless device 110.

Other embodiments of radio network node 120 include additional components (beyond those shown in FIG. 9) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, in some embodiments, the methods and apparatus disclosed herein may facilitate reference signals transmitted with a density that enables channel estimation performance to be tailored to the needs of a specific UE. Link performance may be used more efficiently to improve overall system performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

ABBREVIATIONS USED IN THE PRECEDING DESCRIPTION INCLUDE

3GPP 3rd Generation Partnership Project
ABS Almost Blank Subframes
APRSR Antenna Port Reference Signal Resource
BLER Block Error Rate
CE Control Element
CQI Channel Quality Information
CSI Channel State Information
CSI-RS Channel State Information Reference Signal
CSI-IM Channel State Information Interference Measurement
DCI Downlink Control Information
eNB Enhanced Node-B
ePDCCH Enhance Physical Downlink Control Channel
ICI Inter-Cluster Interference
LTE Long Term Evolution
MAC Media Access Control
MBSFN Multicast-Broadcast Single-Frequency Network
MTC Machine Type Communication
PDCCH Physical Downlink Control Channel
PDSCH Physical Downlink Shared Channel
PMI Precoder Matrix Indicator
PQI PDSCH Rate Matching and Quasi-co-location Indicator
PUCCH Physical Uplink Control Channel
PUSCH Physical Uplink Shared Channel
QoS Quality of Service
RI Rank Indicator
RSRP Reference Signal Received Power
SINR Signal to Interference plus Noise Ratio
TDD Time Division Duplexing
TP Transmission Point
UE User Equipment
ZP Zero Power

The invention claimed is:

1. A method in a network node of increasing a density of reference signals of a wireless network, the method comprising:
    determining a first mapping of one or more reference signals to one or more antenna ports, wherein each of the one or more antenna ports is mapped to a single antenna port reference signal resource (APRSR), wherein an APRSR comprises a pair of consecutive time-frequency resource elements of a radio subframe;
    transmitting the one or more reference signals to a first user equipment according to the first mapping of reference signals, antenna ports, and APRSR;

determining an interference pattern in the wireless network;

based on the determined interference pattern, increasing a density of the one or more reference signals by determining a second mapping of the one or more reference signals to the one or more antenna ports, wherein each of the one or more antenna ports is mapped to at least two APRSR; and transmitting the one or more reference signals to the first user equipment according to the second mapping of reference signals, antenna ports, and APRSR.

2. The method of claim 1, further comprising transmitting the second mapping of reference signals, antenna ports, and APRSR to the first user equipment.

3. The method of claim 1, wherein:

each of the APRSR in the second mapping of reference signals, antenna ports, and APRSR is associated with one reference signal configuration, wherein the reference signal configuration comprises a predetermined pattern of one or more APRSR; and the number of antenna ports, N(ap), in the second mapping of reference signals, antenna ports, and APRSR is less than or equal to the number of APRSR, N(r), in the associated reference signal configuration.

4. The method of claim 1, wherein:

the APRSR in the second mapping of reference signals, antenna ports, and APRSR are associated with at least two reference signal configurations, wherein each reference signal configuration comprises a predetermined pattern of one or more APRSR; and the number of reference signal configurations, N(rsc), associated with the APRSR in the second mapping of reference signals, antenna ports, and APRSR is less than the number of antenna ports, N(ap), in the second mapping.

5. The method of claim 4, further comprising transmitting an indication to the first user equipment that two or more reference signals are quasi co-located.

6. The method of claim 1, wherein:

the second mapping of reference signals, antenna ports, and APRSR is associated with a first subframe; and the method further comprising:

determining a third mapping of the one or more reference signals to the one or more antenna ports, wherein each of the one or more antenna ports is mapped to at least one APRSR associated with a second subframe; and transmitting the second mapping of reference signals, antenna ports, and APRSR associated with the first subframe and the third mapping of reference signals, antenna ports, and APRSR associated with the second subframe to the first user equipment.

7. A method in a wireless device of increasing a density of reference signals of a wireless network, the method comprising:

receiving, from a radio network node, a first mapping of one or more reference signals to one or more antenna ports, wherein each of the one or more antenna ports is mapped to a single antenna port reference signal resource (APRSR), wherein an APRSR comprises a pair of consecutive time-frequency resource elements of a radio subframe;

receiving, from the radio network node, the one or more reference signals according to the first mapping of reference signals, antenna ports, and APRSR;

measuring at least one of the received one or more reference signals to determine channel information;

determining, based on the channel information, that a channel quality is below a threshold;

transmitting a channel state indication to the network node;

receiving, from the radio network node, a second mapping of the one or more reference signals to the one or more antenna ports, wherein each of the one or more antenna ports is mapped to at least two APRSR; and receiving, from the radio network node, the one or more reference signals according to the second mapping of reference signals, antenna ports, and APRSR.

8. The method of claim 7, wherein:

each of the APRSR in the second mapping of reference signals, antenna ports, and APRSR is associated with one reference signal configuration, wherein the reference signal configuration comprises a predetermined pattern of one or more APRSR; and the number of antenna ports, N(ap), in the second mapping of reference signals, antenna ports, and APRSR is less than or equal to the number of APRSR, N(r), in the associated reference signal configuration.

9. The method of claim 7, wherein:

the APRSR in the second mapping of reference signals, antenna ports, and APRSR are associated with at least two reference signal configurations, wherein each reference signal configuration comprises a predetermined pattern of one or more APRSR; and the number of reference signal configurations, N(rsc), associated with the APRSR in the second mapping of reference signals, antenna ports, and APRSR is less than the number of antenna ports, N(ap), in the second mapping.

10. The method of claim 9, further comprising receiving, from the radio network node, an indication that two or more reference signals are quasi co-located.

11. The method of claim 7, wherein:

the first mapping of reference signals, antenna ports, and APRSR is associated with a first subframe; and the second mapping of reference signals, antenna ports, and APRSR is associated with a second subframe.

12. A radio network node capable of increasing a density of reference signals of a wireless network, the radio network node comprising a processor operable to:

determine a first mapping of one or more reference signals to one or more antenna ports, wherein each of the one or more antenna ports is mapped to a single antenna port reference signal resource (APRSR), wherein an APRSR comprises a pair of consecutive time-frequency resource elements of a radio subframe;

transmit the one or more reference signals to a first user equipment according to the first mapping of reference signals, antenna ports, and APRSR;

determine an interference pattern in the wireless network;

based on the determined interference pattern, increase a density of the one or more reference signals by determining a second mapping of the one or more reference signals to the one or more antenna ports, wherein each of the one or more antenna ports is mapped to at least two APRSR; and transmit the one or more reference signals to the first user equipment according to the second mapping of reference signals, antenna ports, and APRSR.

13. The radio network node of claim 12, wherein:

each of the APRSR in the second mapping of reference signals, antenna ports, and APRSR is associated with one reference signal configuration, wherein the reference signal configuration comprises a predetermined pattern of one or more APRSR; and the number of antenna ports, N(ap), in the second mapping of reference signals, antenna ports, and APRSR is less than or equal to the number of APRSR, N(r), in the associated reference signal configuration.

14. The radio network node of claim 12, wherein:

the APRSR in the second mapping of reference signals, antenna ports, and APRSR are associated with at least two reference signal configurations, wherein each reference signal configuration comprises a predetermined pattern of one or more APRSR; and the number of reference signal configurations, N(rsc), associated with the APRSR in the second mapping of reference signals, antenna ports, and APRSR is less than the number of antenna ports, N(ap), in the second mapping.

15. The radio network node of claim 14, wherein the processor is further operable to transmit an indication to the first user equipment that two or more reference signals are quasi co-located.

16. The radio network node of claim 12, wherein:

the second mapping of reference signals, antenna ports, and APRSR is associated with a first subframe; and the processor is operable to:

determine a third mapping of the one or more reference signals to the one or more antenna ports, wherein each of the one or more antenna ports is mapped to at least one APRSR associated with a second subframe; and transmit the second mapping of reference signals, antenna ports, and APRSR associated with the first subframe and the third mapping of reference signals, antenna ports, and APRSR associated with the second subframe to the first user equipment.

17. A user equipment of a wireless network, the user equipment comprising a processor operable to:

receive, from a radio network node, a first mapping of one or more reference signals to one or more antenna ports, wherein each of the one or more antenna ports is mapped to a single antenna port reference signal resource (APRSR), wherein an APRSR comprises a pair of consecutive time-frequency resource elements of a radio subframe;

receive, from the radio network node, the one or more reference signals according to the first mapping of reference signals, antenna ports, and APRSR;

measure at least one of the received one or more reference signals to determine channel information;

determine, based on the channel information, that a channel quality is below a threshold;

transmit a channel state indication to the network node;

receive, from the radio network node, a second mapping of the one or more reference signals to the one or more antenna ports, wherein each of the one or more antenna ports is mapped to at least two APRSR; and receive, from the radio network node, the one or more reference signals according to the second mapping of reference signals, antenna ports, and APRSR.

18. The user equipment of claim 17, wherein:

each of the APRSR in the second mapping of reference signals, antenna ports, and APRSR is associated with one reference signal configuration, wherein the reference signal configuration comprises a predetermined pattern of one or more APRSR; and the number of antenna ports, N(ap), in the second mapping of reference signals, antenna ports, and APRSR is less than or equal to the number of APRSR, N(r), in the associated reference signal configuration.

19. The user equipment of claim 17, wherein:

the APRSR in the second mapping of reference signals, antenna ports, and APRSR are associated with at least two reference signal configurations, wherein each reference signal configuration comprises a predetermined pattern of one or more APRSR; and the number of reference signal configurations, N(rsc), associated with the APRSR in the second mapping of reference signals, antenna ports, and APRSR is less than the number of antenna ports, N(ap), in the second mapping.

20. The user equipment of claim 19, wherein the processor is operable to receive, from the radio network node, an indication that two or more reference signals are quasi co-located.

21. The user equipment of claim 17, wherein:

the first mapping of reference signals, antenna ports, and APRSR is associated with a first subframe; and the second mapping of reference signals, antenna ports, and APRSR is associated with a second subframe.

* * * * *